US012812159B2

(12) United States Patent
Heo et al.

(10) Patent No.: US 12,812,159 B2
(45) Date of Patent: Nov. 24, 2026

(54) METHOD AND APPARATUS FOR VIDEO CODING USING IMPROVED MERGE WITH MOTION VECTOR DIFFERENCE

(71) Applicants: HYUNDAI MOTOR COMPANY, Seoul (KR); KIA CORPORATION, Seoul (KR)

(72) Inventors: Jin Heo, Yongin-si (KR); Seung Wook Park, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 198 days.

(21) Appl. No.: 18/753,952

(22) Filed: Jun. 25, 2024

(65) Prior Publication Data

US 2024/0348818 A1 Oct. 17, 2024

Related U.S. Application Data

(63) Continuation of application No. PCT/KR2022/020382, filed on Dec. 14, 2022.

(30) Foreign Application Priority Data

Jan. 4, 2022 (KR) ........................ 10-2022-0000936
Dec. 13, 2022 (KR) ........................ 10-2022-0173958

(51) Int. Cl.
*H04N 19/513* (2014.01)
*H04N 19/105* (2014.01)
*H04N 19/176* (2014.01)

(52) U.S. Cl.
CPC ......... *H04N 19/513* (2014.11); *H04N 19/105* (2014.11); *H04N 19/176* (2014.11)

(58) Field of Classification Search
None
See application file for complete search history.

(56) References Cited

U.S. PATENT DOCUMENTS 10,257,536 B2 4/2019 Huang
10,869,050 B2 12/2020 Li
(Continued)

FOREIGN PATENT DOCUMENTS

KR 20210066891 A 6/2021
KR 20210070386 A 6/2021
(Continued)

OTHER PUBLICATIONS

European Search Report cited in the European patent application No. 22919047.5; Sep. 10, 2025; 50 pp.
(Continued)

*Primary Examiner* — Jessica M Prince
(74) *Attorney, Agent, or Firm* — Lempia Summerfield Katz LLC

(57) ABSTRACT

A method and an apparatus are disclosed for video coding an improved merge with motion vector difference. The video coding method and the apparatus generate a bi-directional motion vector difference adaptively to bi-prediction motion information by using a derived uni-directional motion vector difference according to a merge mode with motion vector difference (MMVD) mode. The video coding method and the apparatus adaptively apply the generated bi-directional motion vector difference to an arbitrary uni-directional reference picture or bi-directional reference pictures.

7 Claims, 11 Drawing Sheets

(56) References Cited

U.S. PATENT DOCUMENTS

| | | | | |
|---|---|---|---|---|
| 11,284,101 | B2 | 3/2022 | Li | |
| 11,381,838 | B2 | 7/2022 | Lai | |
| 11,412,243 | B2 | 8/2022 | Chujoh et al. | |
| 11,463,703 | B2 | 10/2022 | Liu et al. | |
| 11,792,406 | B2 | 10/2023 | Liu et al. | |
| 11,818,377 | B2 | 11/2023 | Li | |
| 12,034,951 | B2 | 7/2024 | Chujoh et al. | |
| 12,058,339 | B2 * | 8/2024 | Park | H04N 19/139 |
| 12,244,817 | B2 | 3/2025 | Liu et al. | |
| 12,355,997 | B2 | 7/2025 | Chujoh et al. | |
| 2020/0260095 | A1 | 8/2020 | Li | |
| 2021/0076055 | A1 | 3/2021 | Li | |
| 2021/0360277 | A1 * | 11/2021 | Jeong | H04N 19/513 |
| 2021/0360284 | A1 | 11/2021 | Lai | |
| 2021/0377520 | A1 | 12/2021 | Chen | |
| 2021/0385461 | A1 | 12/2021 | Liu et al. | |
| 2021/0392356 | A1 | 12/2021 | Chujoh et al. | |
| 2022/0116651 | A1 * | 4/2022 | Park | H04N 19/105 |
| 2022/0150525 | A1 | 5/2022 | Li | |
| 2022/0174286 | A1 * | 6/2022 | Lee | H04N 19/137 |
| 2022/0272354 | A1 | 8/2022 | Liu et al. | |
| 2022/0345734 | A1 | 10/2022 | Chujoh et al. | |
| 2022/0377370 | A1 | 11/2022 | Jang et al. | |
| 2024/0031590 | A1 | 1/2024 | Li | |
| 2024/0056584 | A1 | 2/2024 | Liu et al. | |
| 2024/0323419 | A1 | 9/2024 | Chujoh et al. | |
| 2024/0380893 | A1 * | 11/2024 | Lee | H04N 19/137 |
| 2025/0294176 | A1 | 9/2025 | Chujoh et al. | |

FOREIGN PATENT DOCUMENTS

| | | | |
|---|---|---|---|
| KR | 20210107897 | A | 9/2021 |
| KR | 20210156844 | A | 12/2021 |
| WO | 2020112620 | A2 | 6/2020 |

OTHER PUBLICATIONS

International Search Report and Written Opinion cited in corresponding international patent application No. PCT/KR2022/020382; Dec. 14, 2022; 8 pp.

* cited by examiner

METHOD AND APPARATUS FOR VIDEO CODING USING IMPROVED MERGE WITH MOTION VECTOR DIFFERENCE

CROSS-REFERENCE TO RELATED APPLICATIONS

This application is a continuation of International Application No. PCT/KR2022/020382 filed on Dec. 14, 2022, which claims priority to Korean Patent Application No. 10-2022-0000936 filed on Jan. 4, 2022, and Korean Patent Application No. 10-2022-0173958, filed on Dec. 13, 2022, the entire contents of each of which are incorporated herein by reference.

TECHNICAL FIELD

The present disclosure relates to a video coding method and an apparatus using an improved merge with motion vector difference.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/Advanced Video Coding (AVC), High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

In performing inter prediction, a merge mode uses motion information from a merging candidate list as the motion information of the current block also referred to as CU which is a coding unit block, and the merge mode does transmit no additional motion information. This merge mode advantageously minimizes the amount of bits transmitted, but the merge mode has limitations in expressing optimal motion information. To remedy the shortcomings, the merge mode with motion vector difference (MMVD mode) adds the motion vector difference (MVD) to the motion vector derived by the merge mode to compensate for the motion information.

The MMVD mode can use the derived information on the uni-directional motion vector difference and scaling to generate bi-directional motion vector differences. For example, with the picture order count (POC) difference being the same between the current picture and the L0 and L1 reference pictures, the value of the derived motion vector difference is immediately applied to the L0 and L1 directions. Alternatively, if the absolute value of the POC difference between the current picture and the L0 reference picture is greater than that between the current picture and the L1 picture, the derived motion vector difference is applied in the L0 direction, the derived motion vector difference is scaled, and the scaled motion vector difference is applied in the L1 direction. If the absolute value of the POC difference between the current picture and the L1 reference picture is greater than that between the current picture and the L0 reference picture, the derived motion vector difference is applied in the L1 direction, the derived motion vector difference is scaled, and the scaled motion vector difference is applied in the L0 direction.

As described above, the conventional MMVD mode has the shortcoming of always applying the value of the derived motion vector difference to both bi-directional reference pictures. Therefore, to increase video coding efficiency and enhance video quality, the MMVD mode needs improvements.

SUMMARY

The present disclosure seeks to provide a video coding method and an apparatus for generating a bi-directional motion vector difference adaptively to bi-prediction motion information by using a derived uni-directional motion vector difference according to a merge mode with motion vector difference (MMVD mode) to enhance video quality and increase video coding efficiency. The video coding method and the apparatus adaptively apply the generated bi-directional motion vector difference to an arbitrary uni-directional reference picture or bi-directional reference pictures.

At least one aspect of the present disclosure provides a method performed by a video decoding device for generating motion vectors of a current block. The method includes generating, by using a merge mode, bi-directional motion vector predictors of the current block. In this example, the bi-directional motion vector predictors include an L0-directional motion vector predictor and an L1-directional motion vector predictor. The method also includes generating, corresponsive to the current block, a motion vector difference that is uni-directional by using a merge mode with motion vector difference. The method also includes obtaining application direction-indication information that indicates an L0 direction, an L1 direction, or both L0 and L1 directions. The method also includes generating bi-directional motion vectors of the current block by applying the motion vector difference to the L0-directional motion vector predictor, the L1-directional motion vector predictor, or the bi-directional motion vector predictors in accordance with the application direction-indication information.

Another aspect of the present disclosure provides a method performed by a video encoding device for generating motion vectors of a current block. The method includes generating, by using a merge mode, bi-directional motion vector predictors of the current block. In this example, the bi-directional motion vector predictors include an L0-directional motion vector predictor and an L1-directional motion vector predictor. The method also includes generating, corresponsive to the current block, a motion vector difference that is uni-directional by using a merge mode with motion vector difference. The method also includes applying the motion vector difference to the L0-directional motion vector predictor, the L1-directional motion vector predictor, and the bi-directional motion vector predictors to select an optimal direction, and generating, based on the optimal direction, bi-directional motion vectors of the current block. The method also includes generating, based on the optimal direction, application direction-indication information that indicates an L0 direction, an L1 direction, or both L0 and L1 directions.

Yet another aspect of the present disclosure provides a computer-readable recording medium storing a bitstream generated by a video encoding method. The video encoding method includes generating, by using a merge mode, bi-directional motion vector predictors of a current block. In this example, the bi-directional motion vector predictors include an L0-directional motion vector predictor and an L1-directional motion vector predictor. The video encoding method also includes generating, corresponsive to the current block, a motion vector difference that is uni-directional by using a merge mode with motion vector difference. The video encoding method also includes applying the motion vector difference to the L0-directional motion vector predictor, the L1-directional motion vector predictor, and the bi-directional motion vector predictors to select an optimal direction, and generating, based on the optimal direction, bi-directional motion vectors of the current block. The video encoding method also includes generating, based on the optimal direction, application direction-indication information that indicates an L0 direction, an L1 direction, or both L0 and L1 directions.

As described above, the present disclosure provides a video coding method and an apparatus for generating a bi-directional motion vector difference adaptively to bi-prediction motion information by using a derived uni-directional motion vector difference according to an MMVD mode. The video coding method and the apparatus adaptively apply the generated bi-directional motion vector difference to an arbitrary uni-directional reference picture or bi-directional reference pictures. The video coding method and the apparatus according to an embodiment of the present disclosure improve video quality and increase video coding efficiency.

Figure 1:
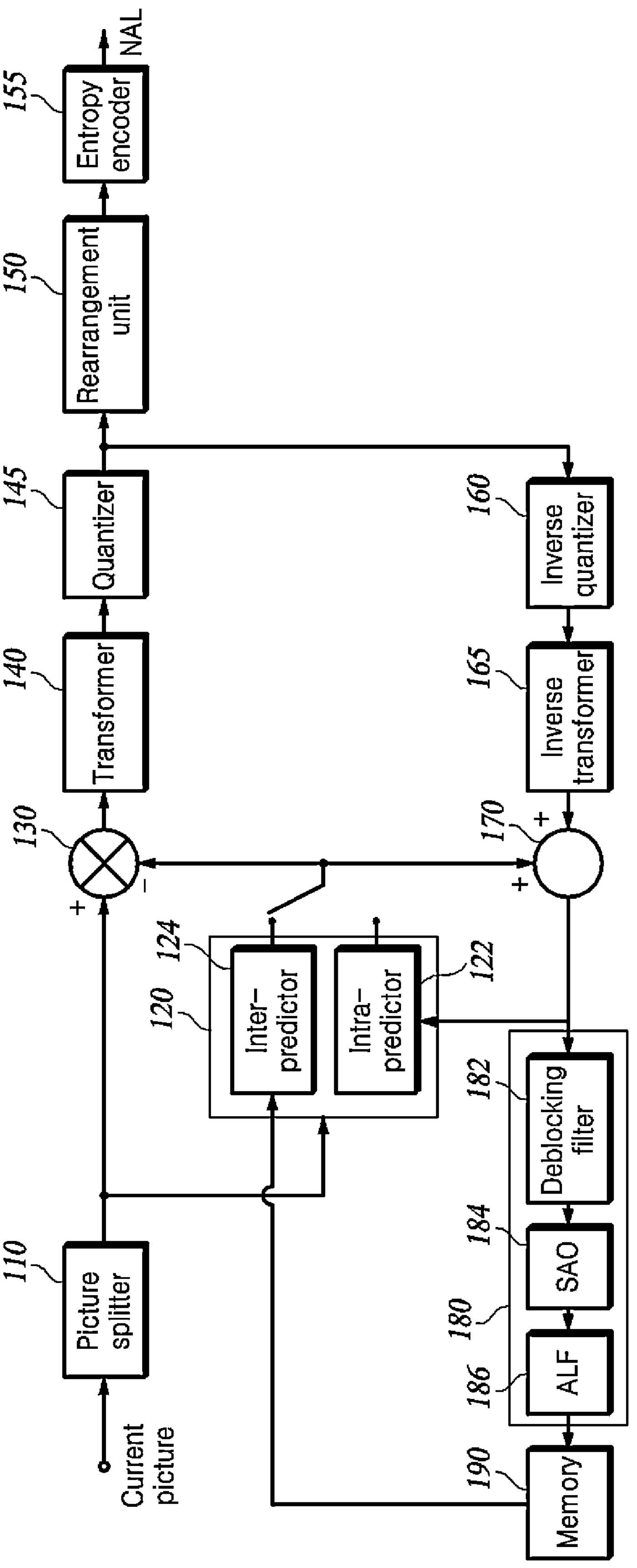
FIG. 1 is a block diagram of a video encoding apparatus according to an embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus according to an embodiment of the present disclosure. The video encoding apparatus may implement technologies or methods in accordance with one or more embodiments of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. One or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. In this example, a binarytree ternarytree (BTTT) is added to the tree structures to be referred to as a multiple-type tree (MTT).

Figure 2:
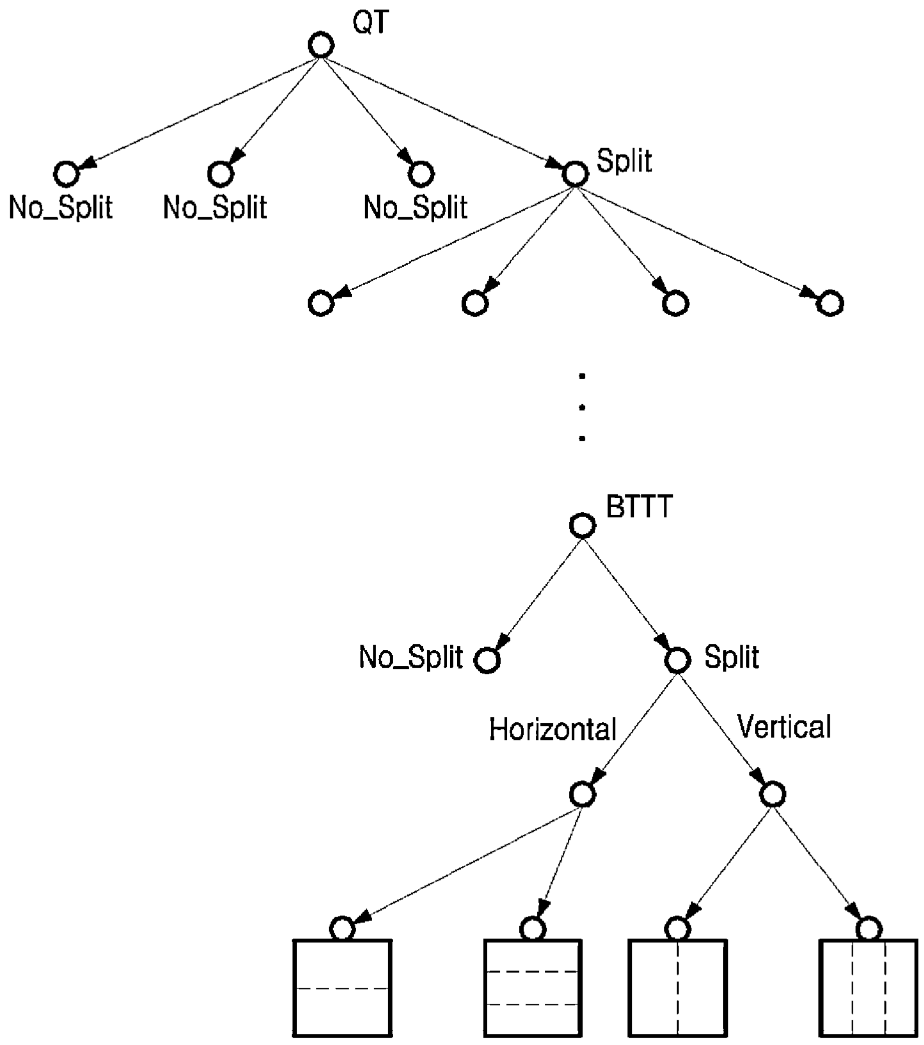
FIG. 2 illustrates a method for partitioning a block using a quadtree plus binarytree ternarytree (QTBTTT) structure according to an embodiment of the present disclosure.

FIG. 2 is a diagram for describing a method for splitting a block by using a QTBTTT structure according to an embodiment of the present disclosure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. A type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
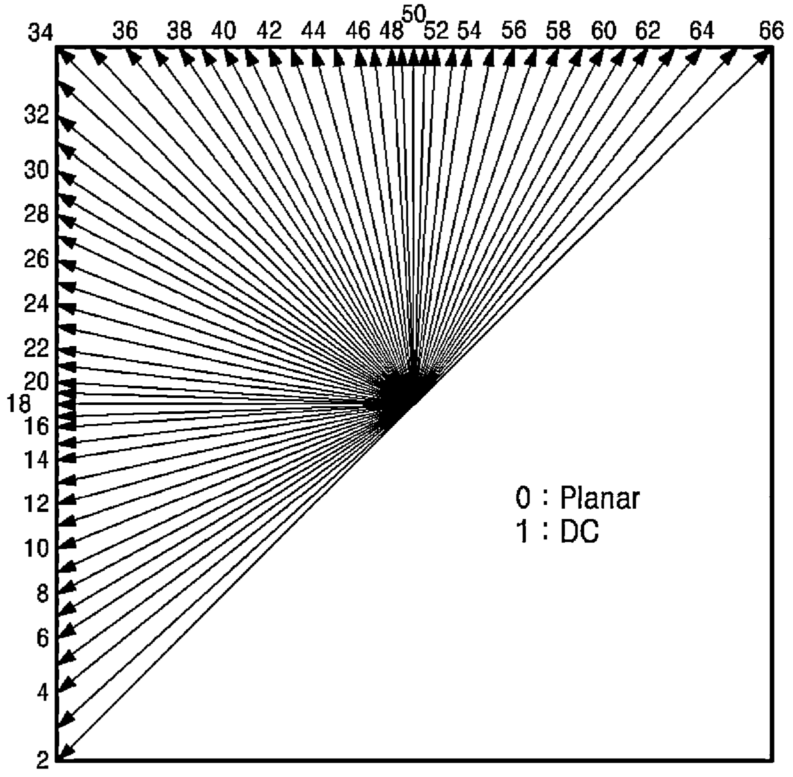
FIGS. 3A and 3B illustrate a plurality of intra prediction modes including wide-angle intra prediction modes according to some embodiments of the present disclosure.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a direct current (DC) mode and may include 65 directional modes. A neighboring pixel and an arithmetic equation to be used are defined differently according to each prediction mode.

Figure 3B:
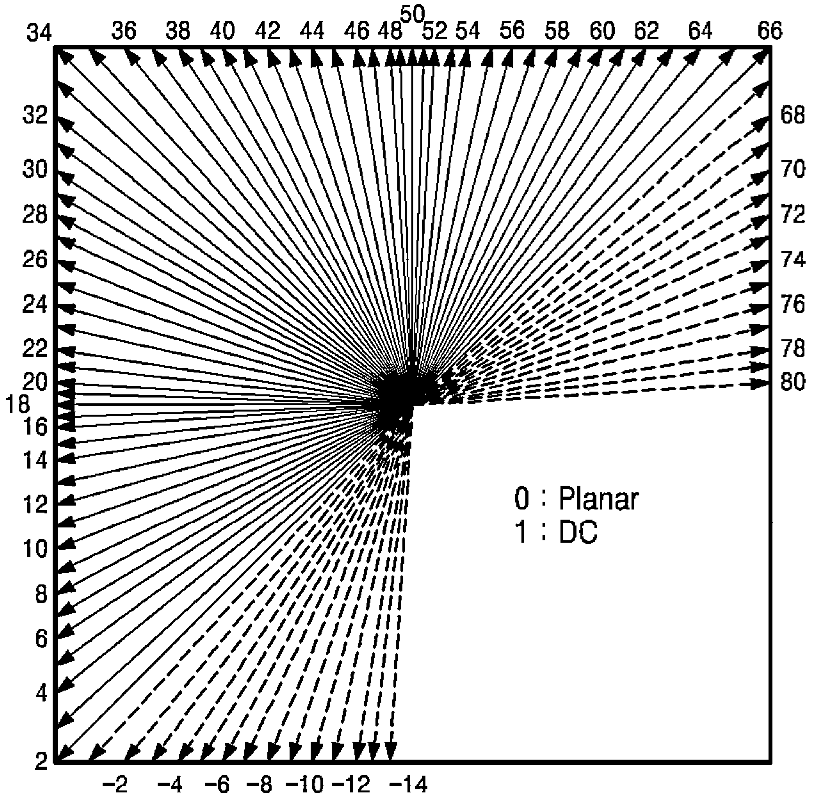

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this example, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than-135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

The inter predictor 124 may perform inter prediction by using bi-prediction. With regard to bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. In this example, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method may be referred to as a merge mode.

In the merge mode, the inter predictor 124 selects a predetermined number of merge candidate blocks (hereinafter, referred to as a “merge candidate”) from the neighboring blocks of the current block.

Figure 4:
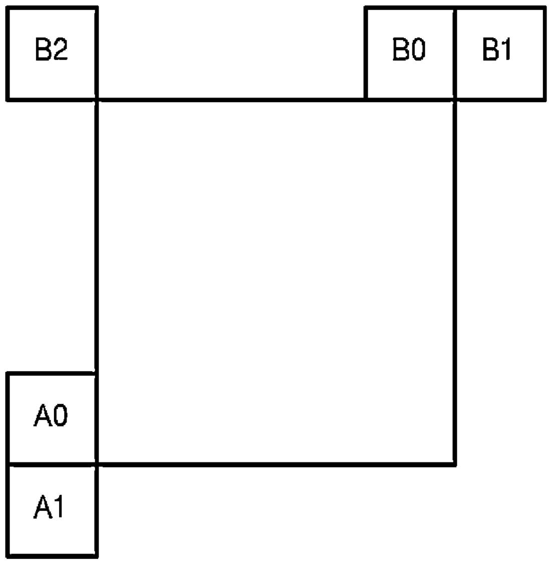
FIG. 4 illustrates neighboring blocks of a current block according to an embodiment of the present disclosure.

As a neighboring block for deriving the merge candidate, all or some of a left block A0, a bottom left block A1, a top block B1, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is an example of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this example, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this example, information on the motion vector difference and information on the reference picture used for predicting the current block are encoded.

The motion vector predictor may also be determined by a scheme of selecting any one of the motion vector predictor candidates. In this example, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. The transform area subblock may be one of two rectangular blocks having a size ratio of 1:1 based on a horizontal axis (or vertical axis). In this example, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this example, a flag (cu_sbt_quad_flag) dividing the corresponding splitting is additionally encoded by the entropy encoder 155 and signaled to the video decoding apparatus.

The transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a two-dimensional (2D) coefficient array to a one-dimensional (1D) coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, and the like, related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (with regard to the merge mode, a merge index and with regard to the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, and the like, which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. The ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
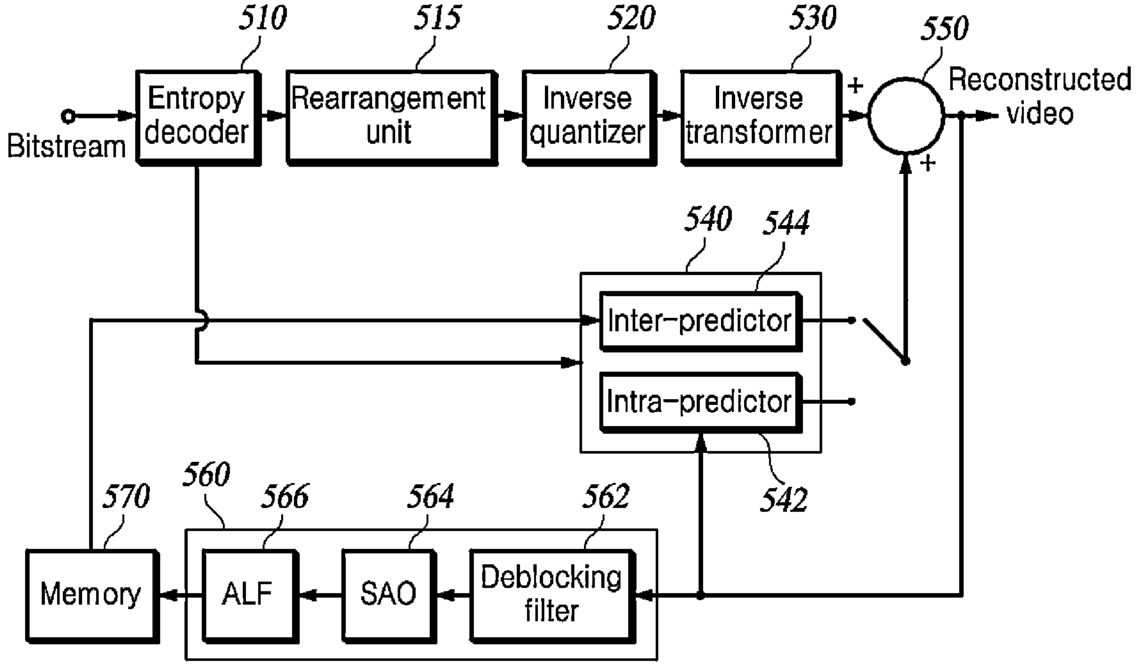
FIG. 5 is a block diagram of a video decoding apparatus according to an embodiment of the present disclosure.

FIG. 5 is a functional block diagram of a video decoding apparatus according to an embodiment of the present disclosure. The video encoding apparatus may implement technologies or methods in accordance with one or more embodiments of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

When the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for generating a bi-directional motion vector difference adaptively to bi-prediction motion information by using a uni-directional motion vector difference derived according to a merge mode with motion vector difference (MMVD mode). The video coding method and the apparatus adaptively apply the generated bi-directional motion vector difference to an arbitrary uni-directional reference picture or bi-directional reference pictures.

The following embodiments may be performed by the inter predictor 124 in the video encoding device. The following embodiments may also be performed by the inter predictor 544 in the video decoding device.

The video encoding device when encoding the current block may generate signaling information associated with the present embodiments in terms of optimizing rate distortion. The video encoding device may use the entropy encoder 155 to encode the signaling information and may transmit the encoded signaling information to the video decoding device. The video decoding device may use the entropy decoder 510 to decode, from the bitstream, the signaling information associated with decoding the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

Hereinafter, prediction motion information is used interchangeably with motion vector predictor (MVP).

I. Merge/Skip Mode and MMVD

The merge/skip modes include regular merge mode, merge mode with motion vector difference (MMVD), combined inter and intra prediction (CIIP) mode, geometric partitioning mode (GPM) mode, and subblock merge mode. The subblock merge mode is divided into subblock-based temporal motion vector prediction (SbTMVP) mode and affine merge mode.

The advanced motion vector prediction (AMVP) mode includes a regular AMVP mode, a symmetric MVD (motion vector difference) mode, and an affine AMVP mode.

The following describes a method of composing a merging candidate list of motion information in regular merging/skipping mode. To support the merging/skipping mode, the inter predictor 124 in the video encoding device may select a preset number of (e.g., 6) merge candidates to compose the merging candidate list.

The inter predictor 124 searches for spatial merge candidates. The inter predictor 124 searches for spatial merge candidates from neighboring blocks as illustrated in FIG. 4. At most four spatial merge candidates may be selected. A spatial merge candidate is also referred to as a Spatial MVP (SMVP).

The inter predictor 124 searches for a temporal merge candidate. The inter predictor 124 may add as a temporal merge candidate such block that is co-located with the current block in a reference picture (which may be the same as or different from the reference picture used to predict the current block) other than the current picture that holds the target block. One temporal merge candidate may be selected. A temporal merge candidate is also referred to as a Temporal MVP (TMVP).

The inter predictor 124 searches for history-based motion vector predictor (HMVP) candidates. The inter predictor 124 stores in a table the motion vectors of the previous h (where h is a natural number) CUs for use as merge candidates. The table has a size of 6 and stores the motion vectors of the previous CUs in a first-in-first-out (FIFO) fashion. This indicates that up to six HMVP candidates are stored in the table. The inter predictor 124 may set as merge candidates the most recent motion vectors among the HMVP candidates stored in the table.

The inter predictor 124 searches for Pairwise Average MVP (PAMVP) candidates. The inter predictor 124 may set as the merge candidate the average of the motion vectors of the first candidate and the second candidate in the merging candidate list.

If the merging candidate list cannot be fulfilled (i.e., the preset number of candidates is not filled) after performing all of the above-described searches, the inter predictor 124 adds a zero motion vector as the merge candidate.

In terms of optimizing coding efficiency, the inter predictor 124 may determine a merge index that indicates one candidate in the merging candidate list. The inter predictor 124 may use the merge index to derive a motion vector predictor (MVP) from the merging candidate list and determine the MVP as the motion vector of the current block. Further, the video encoding device may signal the merge index to the video decoding device.

The video encoding device, with regard to the skip mode, utilizes the same method of transmitting the motion vector as in the merge mode but does not transmit a residual block that equals to the difference between the current block and the prediction block.

The method of composing the merging candidate list described above may be equally performed by the inter predictor in the video decoding device. The video decoding device may decode the merge index. The inter predictor 544 may use the merge index to derive the MVP from the merging candidate list, and then may determine the MVP as the motion vector of the current block.

When the MMVD mode is utilized, the inter predictor 124 may derive the MVP from the merging candidate list by using the merge index. For example, the first or second candidate in the merging candidate list may be utilized as the MVP. Further, in terms of optimizing coding efficiency, the inter predictor 124 determines motion vector difference information. The motion vector difference information includes a distance index, which is a magnitude information, and a direction index, which is a direction information. The inter predictor 124 may use the distance index and the direction index to derive a motion vector difference (MVD), and then may sum the MVD and the MVP to reconstruct the motion vector of the current block. Further, the video encoding device may signal the merge index and motion vector difference information to the video decoding device.

According to the direction information, correction can be made in a vertical or horizontal direction, and one of four directions is determined as the direction information by the direction index as shown in Table 1.

TABLE 1

| Direction Index | Horizontal | Vertical |
|---|---|---|
| 0 | +1 | 0 |
| 1 | −1 | 0 |
| 2 | 0 | +1 |
| 3 | 0 | −1 |

The magnitude information determines the magnitude of the motion vector difference in the range of ¼ pixel to 32 pixels, and the magnitude information is determined by the distance index as shown in Table 2.

TABLE 2

| Distance Index | 0 | 1 | 2 | 3 | 4 | 5 | 6 | 7 |
|---|---|---|---|---|---|---|---|---|
| Distance Difference (luma pixel unit) | ¼ | ½ | 1 | 2 | 4 | 8 | 16 | 32 |

The MMVD mode described above may be equally performed in the video decoding device by the inter predictor 544. The video decoding device may decode the merge index and motion vector difference information. After composing the merging candidate list, the inter predictor 544 may use the merge index to derive the MVP from the merging candidate list. After deriving the MVD by using the motion vector difference information, the inter predictor 544 may sum the MVD and the MVP to reconstruct the motion vector of the current block.

The MMVD mode may use the derived uni-directional motion vector difference and scaling to generate a motion vector difference corresponsive to the bi-prediction motion information. For example, if the picture order count (POC) difference between the current picture and the L0 and L1 reference pictures is the same, the value of the derived motion vector difference is immediately applied to the L0 and L1 directions. In this example, L0 represents reference picture list 0 and L1 represents reference picture list 1. If the absolute value of the POC difference between the current picture and the L0 reference picture is greater than that between the current picture and the L1 picture, the derived motion vector difference is applied in the L0 direction, the derived motion vector difference is scaled, and the scaled motion vector difference is applied in the L1 direction. If the absolute value of the POC difference between the current picture and the L1 reference picture is greater than that between the current picture and the L0 reference picture, the derived motion vector difference is applied in the L1 direction, the derived motion vector difference is scaled, and the scaled motion vector difference is applied in the L0 direction.

As described above, the conventional MMVD mode has the shortcoming of always applying the value of the derived motion vector difference to both bi-directional reference pictures. To address this shortcoming, a method is now provided for adaptively applying motion vector difference information to an arbitrary uni-directional reference picture or bi-directional reference pictures.

Hereinafter, embodiments of the present disclosure are described centering around the video encoding device, but embodiments of the present may be similarly applied to the video decoding device.

II. Embodiments According to the Present Disclosure

<Embodiment 1> Adaptively Generating Bi-Directional Motion Vector Difference from Uni-Directional Motion Vector Difference In this embodiment, the video encoding device generates a bi-directional motion vector difference for the bi-prediction motion information by using the uni-directional motion vector difference and scaling derived according to the MMVD mode. The bi-prediction motion information, i.e., the bi-directional motion vector predictors, may be generated according to the conventional merge mode. The video encoding device then applies the motion vector difference to the L0 and L1 motion vector predictors to generate a final bi-directional motion vector. The video encoding device may utilize an implicit method or an explicit method to generate the bi-directional motion vector difference.

<Embodiment 1-1> Generating Bi-Directional Motion Vector Difference According to the Implicit Method In this embodiment, the video encoding device generates the bi-directional motion vector difference corresponsive to the bi-prediction motion information according to the implicit method. In this embodiment, similar to the conventional MMVD mode, the video encoding device determines the bi-directional motion vector difference by taking account of a POC difference between the current picture and the reference picture, as follows.

With the same POC difference between the current picture and the L0 and L1 reference pictures, the video encoding device immediately applies the value of the derived motion vector difference in both the L0 and L1 directions. In other words, the video encoding device generates the bi-directional motion vector difference as in the conventional MMVD mode.

With unequal POC differences between the current picture and the L0 and L1 reference pictures, the video encoding device applies the derived motion vector difference immediately to the motion vector predictor in the reference picture direction with a small absolute value of the POC difference and applies the difference scaled to the motion vector predictor in the reference picture direction with a large absolute value of the POC difference. Compared to the conventional method, the present embodiment has different conditions for applying scaling to the derived motion vector difference. The conventional MMVD mode applies scaling to the motion vector difference derived in the direction with a small POC difference, while the present embodiment applies scaling to the motion vector difference derived in the direction with a large POC difference. In this embodiment, application method-indication information that indicates one of these different methods may be preset according to an arrangement between the video encoding device and the video decoding device, obviating the need for transmitting/parsing the application method-indication information.

<Embodiment 1-2> Generating Bi-Directional Motion Vector Difference According to the Explicit Method In this embodiment, the video encoding device generates the bi-directional motion vector difference corresponsive to the bi-prediction motion information according to the explicit method. In this embodiment, similar to the conventional MMVD mode, the video encoding device determines the bi-directional motion vector difference by taking account of a POC difference between the current picture and the reference picture, as follows.

With the same POC difference between the current picture and the L0 and L1 reference pictures, the video encoding device immediately applies the value of the derived motion vector difference in both the L0 and L1 directions. In other words, the video encoding device generates the bi-directional motion vector difference as in the conventional MMVD mode.

With unequal POC differences between the current picture and the L0 and L1 reference pictures, in the conventional MMVD mode, the video encoding device scales and applies the derived motion vector difference value to the motion vector predictor in the reference picture direction with a small absolute value of the POC difference, while applying the same difference value to the motion vector predictor in the reference picture direction with a large absolute value of the POC difference. However, in the implicit method according to Embodiment 1-1, the video encoding device further scales and applies the motion vector difference value derived according to the MMVD mode to the motion vector predictor in the reference picture direction having a large absolute value of the POC difference, while applying the same difference value immediately to the motion vector predictor in the reference picture direction having a small absolute value of the POC difference. Furthermore, the application method-indication information indicating one of these different methods may be set in advance according to an agreement between the video encoding device and the video decoding device, the present disclosure obviates the need for transmitting/parsing the application method-indication information.

In the explicit method according to the present embodiment, the video encoding device determines one method between the conventional MMVD mode and the method according to Embodiment 1-1, as the application method-indication information, and then transmits the application method-indication information to the video decoding device. Upon comparing the conventional method and the method according to Embodiment 1-1 based on various measurement methods such as rate-distortion optimization (RDO), a sum of absolute difference (SAD), a sum of square difference (SSE), and the like, the video encoding device selects a suitably application method. The video encoding device then transmits, as the application method-indication information, a 1-bit flag indicating the application method to the video decoding device per a block basis.

<Embodiment 2> Adaptively Applying the Derived Motion Vector Difference to an Arbitrary Uni-Directional Reference Picture or Bi-Directional Reference Pictures In this embodiment, instead of generating a bi-directional motion vector by applying all derived uni-directional motion vector differences to the bi-prediction motion information, the video encoding device adaptively applies the derived uni-directional motion vector difference to ① only L0-directional motion information, ② only L1-directional motion information, or ③ both L0 and L1-directional motion information. The bi-prediction motion information, i.e., the bi-directional motion vector predictors, may be generated according to a conventional merge mode. The video encoding device applies the motion vector difference to the bi-directional motion vector predictors by using an implicit method or an explicit method as follows.

<Embodiment 2-1> Applying to the Bi-Prediction Motion Information According to the Implicit Method In this embodiment, the video encoding device uses the implicit method to adaptively apply the uni-directional motion vector difference derived according to the MMVD mode to the bi-prediction motion information.

Figure 6:
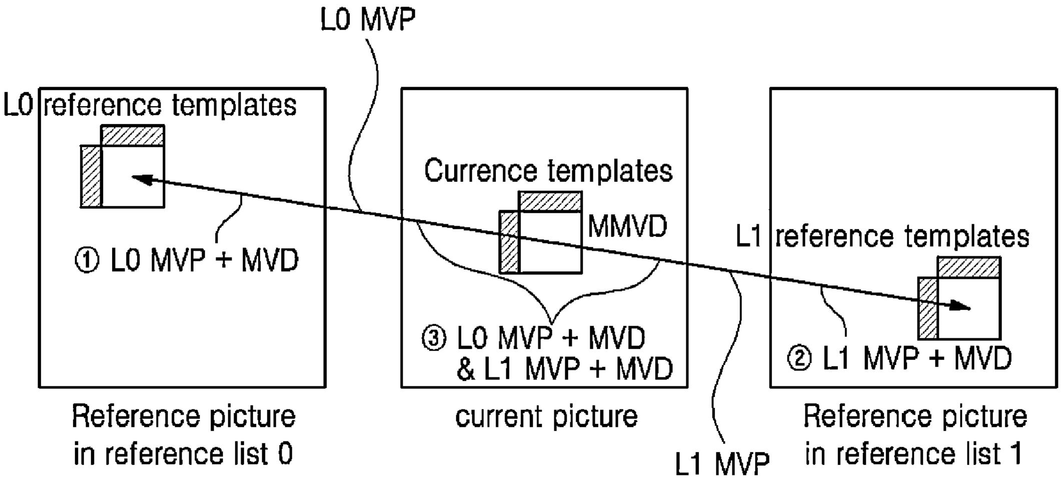
FIG. 6 is a diagram illustrating the generation of bi-directional motion information according to an implicit method, according to at least one embodiment of the present disclosure.

FIG. 6 is a diagram illustrating the generation of bi-directional motion information according to the implicit method, according to at least one embodiment of the present disclosure.

As illustrated in FIG. 6, the video encoding device searches for the reference block that corresponds to the current block by applying the uni-directional motion vector difference information derived according to the MMVD mode to ① only the L0-directional motion information, ② only the L1-directional motion information, or ③ both the L0 and L1-directional motion information. The video encoding device then calculates the cost value between the samples of the current block's neighboring templates (current templates in the example of FIG. 6) and the samples of the neighboring reference templates (L0 reference templates or L1 reference templates in FIG. 6) of the searched reference block and determines the direction and corresponding motion vector with the minimum cost value. Since this process of determining application direction-indication information is commonly performed by the video encoding device and the video decoding device, there is no need to transmit/parsing information on the determined motion vector. The motion vectors corresponding to the application direction-indication information at ①, ②, and ③ described in the example of FIG. 6 are as shown in Table 3.

TABLE 3

| | L0-drectional Motion Vector | L1-drectional Motion Vector |
|---|---|---|
| Motion Vector Difference Applied in L0 Direction (FIG. 6 ①) | L0_MVP + MVD | L1_MVP |
| Motion Vector Difference Applied in L1 Direction (FIG. 6 ②) | L0_MVP | L1_MVP + MVD |
| Motion Vector Difference Applied in L0 & L1 Directions (FIG. 6 ③) | L0_MVP + MVD | L1_MVP + MVD |

In this example, the cost value between the samples of the neighboring template of the current block and the neighboring template samples of the corresponding reference block may be calculated based on various measures, such as rate distortion, sum of absolute transformed differences (SATD), SAD, SSE, and the like. In this example, SATD is a method of calculating SAD after transforming the samples to be compared into samples in the frequency domain.

<Embodiment 2-2> Applying to Bi-Prediction Motion Information According to the Explicit Method In this example, the video encoding device uses the explicit method to adaptively apply the uni-directional motion vector difference information derived according to the MMVD mode to the bi-prediction motion information.

Figure 7:
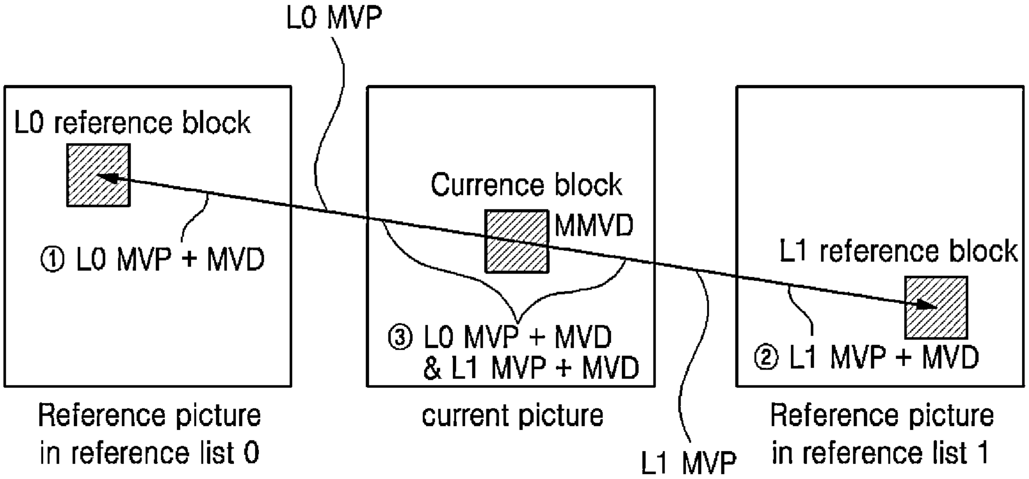
FIG. 7 is a diagram illustrating the generation of bi-directional motion information according to an explicit method, according to at least one embodiment of the present disclosure.

FIG. 7 is a diagram illustrating the generation of bi-directional motion information according to the explicit method, according to at least one embodiment of the present disclosure.

As illustrated in FIG. 7, the video encoding device searches for a reference block corresponding to the current block by applying the uni-directional motion vector difference information derived according to the MMVD mode to ① only the L0-directional motion information, ② only the L1-directional motion information, or ③ both the L0 and L1-directional motion information. The video encoding device then calculates a cost value between the current block (as in the example of FIG. 7) and the searched reference block (the L0 reference block or the L1 reference block in FIG. 7) to determine the direction and the corresponding motion vector with the minimum cost value. The process of determining the motion vector in the explicit method according to Embodiment 2-2, unlike the implicit method according to Embodiment 2-1, uses the information on the current block to determine the motion vector, which takes transmission of the application direction-indication information to the video decoding device. This is because the information on the current block is not available to the video decoding device. The motion vectors corresponding to the application direction-indication information at ①, ②, and ③ illustrated in FIG. 7 are the same as those in Table 3.

The explicit method illustrated in FIG. 7 is the same as the implicit method in FIG. 6. The comparison of the cost values between the current block and the corresponding reference block may be calculated according to various measures such as rate distortion, SATD, SAD, SSE, and the like.

<Embodiment 3> Combining Embodiment 1 and Embodiment 2

In this embodiment, the video encoding device uses the method according to Embodiment 1 and the method according to Embodiment 2 combined. As described above, in Embodiment 1, the video encoding device adaptively generates a bi-directional motion vector difference for the bi-prediction motion information by using the derived uni-directional motion vector difference. In Embodiment 2, the video encoding device adaptively applies the derived motion vector difference to an arbitrary uni-directional reference picture or bi-directional reference pictures.

In one example, the video encoding device adaptively generates a bi-directional motion vector difference for the bi-prediction motion information by using the derived uni-directional motion vector difference according to Embodiment 1. Then, the video encoding device corrects the bi-prediction motion information by using the bi-directional motion vector difference, and adaptively applies the corrected bi-prediction motion information to an arbitrary uni-directional reference picture or bi-directional reference pictures, according to Embodiment 2. The video encoding device may select and use any one of the implicit method and the explicit method offered in each of Embodiment 1 and Embodiment 2.

As another example, the video encoding device adaptively applies the derived uni-directional motion vector difference to the arbitrary uni-directional reference picture or the bi-directional reference pictures, according to Embodiment 2. When the derived uni-directional motion vector difference is applied to the arbitrary uni-directional reference picture, the video encoding device immediately applies the derived uni-directional motion vector difference. When the derived uni-directional motion vector difference is applied to the bi-directional reference pictures, the video encoding device adaptively generates and then uses a bi-directional motion vector difference corresponsive to the bi-prediction motion information by using the derived uni-directional motion vector difference according to Embodiment 1.

Figure 8:
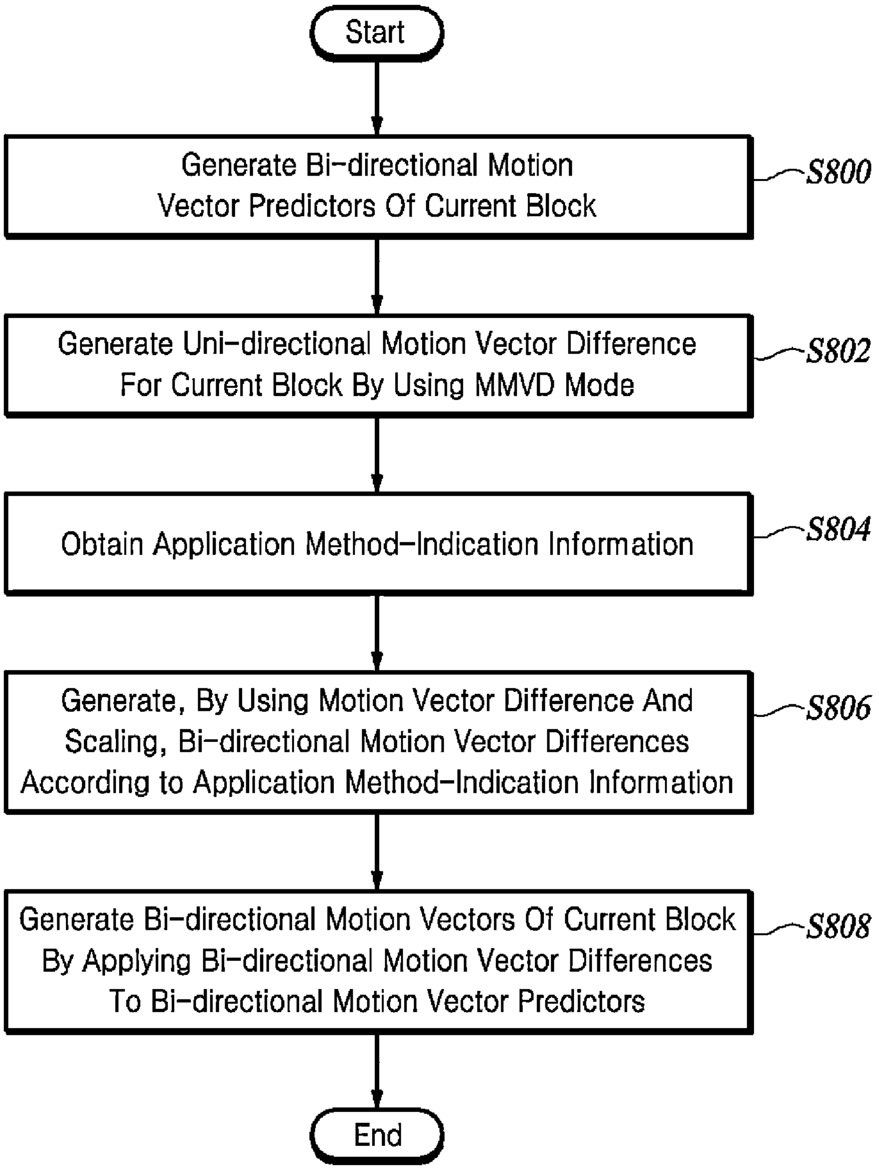
FIG. 8 is a flowchart of a method performed by a video encoding device for generating bi-directional motion vectors of the current block, according to at least one embodiment of the present disclosure.
Figure 9:
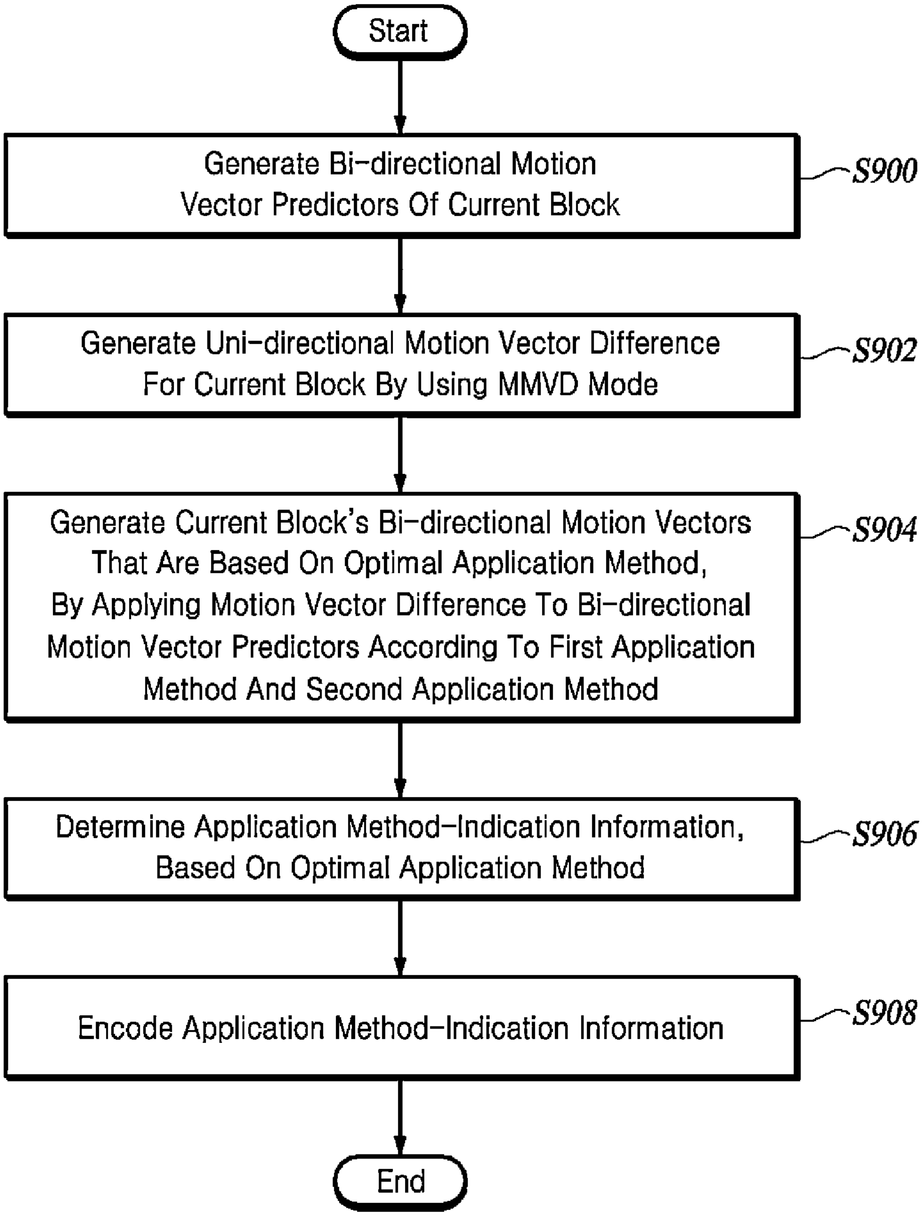
FIG. 9 is a flowchart of a method performed by the video encoding device for generating bi-directional motion vectors of the current block, according to another embodiment of the present disclosure.
Figure 10:
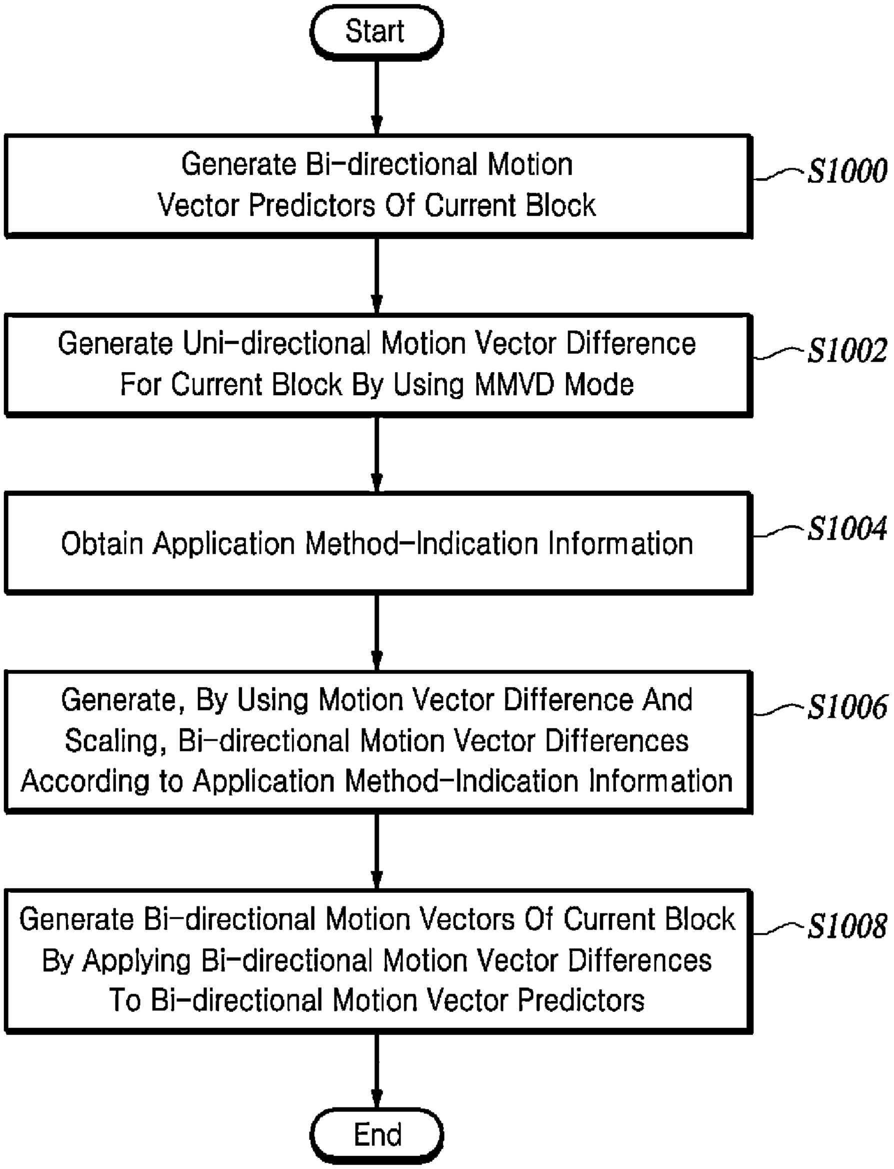
FIG. 10 is a flowchart of a method performed by a video decoding device for generating the bi-directional motion vectors of the current block, according to at least one embodiment of the present disclosure.

Referring now to FIGS. 8 to 10, methods of generating bi-directional motion vectors of the current block based on Embodiment 1 are described.

FIG. 8 is a flowchart of a method performed by a video encoding device for generating bi-directional motion vectors of the current block, according to at least one embodiment of the present disclosure.

The video encoding device generates bi-directional motion vector predictors of the current block by using a merge mode (S800). The bi-directional motion vector predictors include an L0-directional motion vector predictor and an L1-directional motion vector predictor.

The video encoding device generates a uni-directional motion vector difference for the current block by using the MMVD mode (S802).

The video encoding device obtains application method-indication information (S804).

The application method-indication information indicates a first application method or a second application method that applies the motion vector difference to the bi-directional motion vector predictors based on the POC difference between the current picture and the bi-directional reference pictures. The bi-directional reference pictures include the L0 reference picture and the L1 reference picture.

The first application method is a method according to the conventional MMVD mode. So, with unequal POC differences between the current picture, the L0 reference picture, and the L1 reference picture, the video encoding device applies the motion vector difference as is to the motion vector predictor in the reference picture direction with the larger absolute value of the POC difference, and scales the same difference to the motion vector predictor in the reference picture direction with the smaller absolute value of the POC difference.

The second application method is newly presented in Embodiment 1-1. So, with unequal POC differences between the current picture, the L0 reference picture, and the L1 reference picture, the video encoding device applies the motion vector difference as is to the motion vector predictor in the reference picture direction with the smaller absolute value of the POC difference, and scales the same difference to the motion vector predictor in the reference picture direction with the larger absolute value of the POC difference.

The application method-indication information may be preset according to an agreement between the video encoding device and the video decoding device.

The video encoding device generates bi-directional motion vector differences according to the application method-indication information by using the motion vector differences and scaling (S806).

The video encoding device applies the bi-directional motion vector differences to the bi-directional motion vector predictors to generate the bi-directional motion vectors of the current block (S808).

FIG. 9 is a flowchart of a method performed by the video encoding device for generating bi-directional motion vectors of the current block, according to another embodiment of the present disclosure.

The video encoding device generates bi-directional motion vector predictors of the current block by using a merge mode (S900). The bi-directional motion vector predictors include an L0-directional motion vector predictor and an L1-directional motion vector predictor.

The video encoding device generates a uni-directional motion vector difference for the current block by using the MMVD mode (S902).

The video encoding device selects an optimal application method by applying the motion vector difference to the bi-directional motion vector predictors based on a POC difference between the current picture and the bi-directional reference pictures according to the first application method and the second application method and generates bi-directional motion vectors for the current block based on the optimal application method (S904).

The video encoding device determines application method-indication information based on the optimal application method (S906). The application method-indication information indicates the first application method or the second application method.

The video encoding device encodes the application method-indication information (S908). The video encoding device may encode, as the application method-indication information, a flag indicating the first application method or the second application method.

FIG. 10 is a flowchart of a method performed by a video decoding device for generating the bi-directional motion vectors of the current block, according to at least one embodiment of the present disclosure.

The video decoding device generates bi-directional motion vector predictors of the current block by using a merge mode (S1000). The bi-directional motion vector predictors include an L0-directional motion vector predictor and an L1-directional motion vector predictor.

The video decoding device generates a uni-directional motion vector difference for the current block by using the MMVD mode (S1002).

The video decoding device obtains application method-indication information (S1004).

The application method-indication information indicates a first application method or a second application method, which applies the motion vector difference to the bi-directional motion vector predictors based on the POC difference between the current picture and the bi-directional reference pictures. The first application method is a method according to a conventional MMVD mode, and the second application method is newly presented in Embodiment 1-1.

According to Embodiment 1-1, the application method-indication information may be preset according to an agreement between the video encoding device and the video decoding device.

According to Embodiment 1-2, the video decoding device may decode, as the application method-indication information, a flag indicating the first application method or the second application method from the bitstream.

The video decoding device generates bi-directional motion vector differences according to the application method-indication information by using the motion vector difference and scaling (S1006).

The video decoding device applies the bi-directional motion vector differences to the bi-directional motion vector predictors to generate the bi-directional motion vectors of the current block (S1008).

Figure 11:
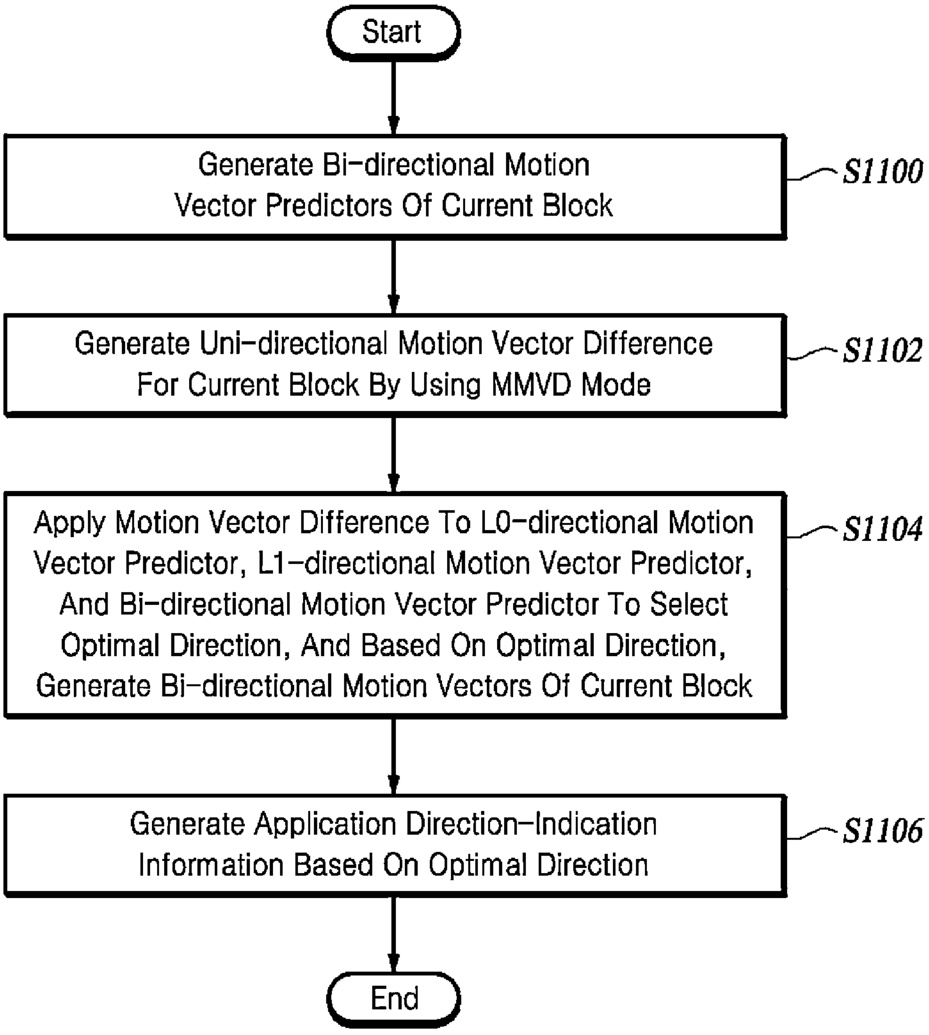
FIG. 11 is a flowchart of a method performed by the video encoding device for generating the bi-directional motion vectors of the current block, according to yet another embodiment of the present disclosure.
Figure 12:
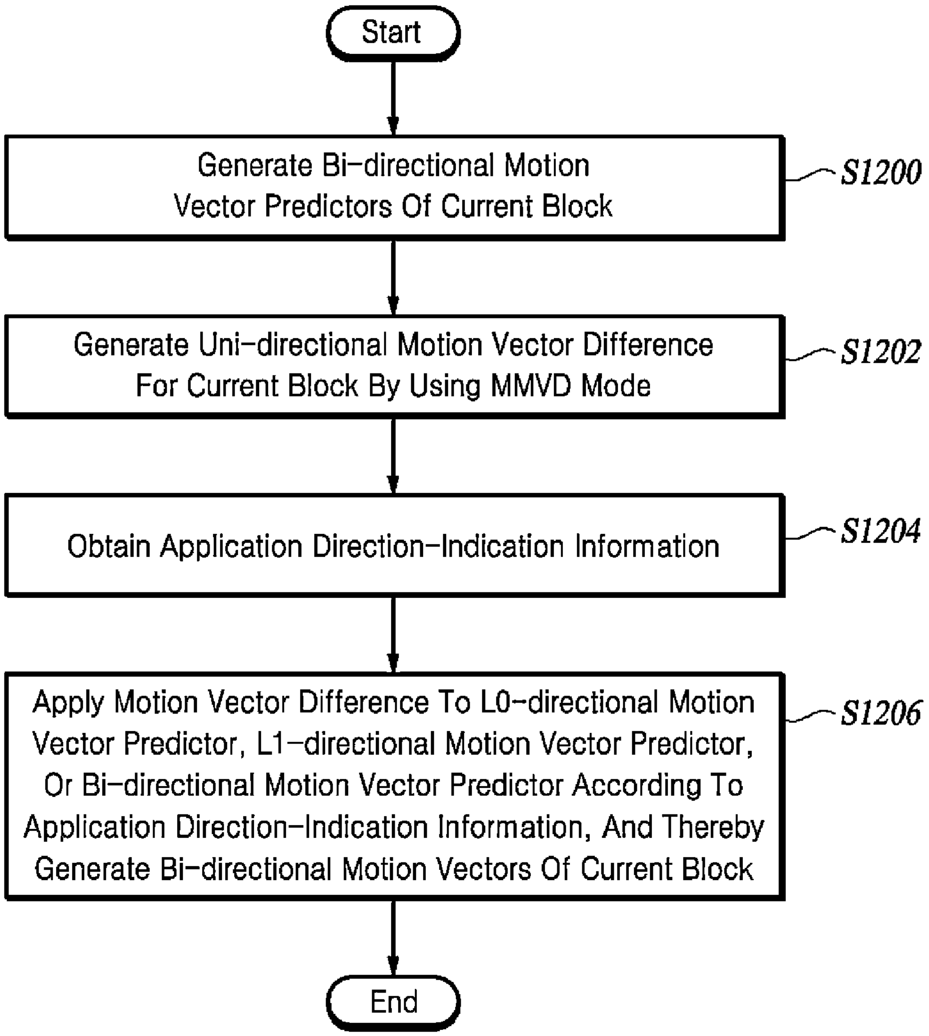
FIG. 12 is a flowchart of a method performed by the video decoding device for generating the bi-directional motion vectors of the current block, according to another embodiment of the present disclosure.

Referring now to FIGS. 11 and 12, methods of generating bi-directional motion vectors of the current block based on Embodiment 2 are described.

FIG. 11 is a flowchart of a method performed by the video encoding device for generating the bi-directional motion vectors of the current block, according to yet another embodiment of the present disclosure.

The video encoding device generates bi-directional motion vector predictors of the current block by using a merge mode (S1100). The bi-directional motion vector predictors include an L0-directional motion vector predictor and an L1-directional motion vector predictor.

The video encoding device generates a uni-directional motion vector difference for the current block by using the MMVD mode (S1102).

The video encoding device applies the motion vector difference to the L0-directional motion vector predictor, the L1-directional motion vector predictor, and the bi-directional motion vector predictors to select an optimal direction, and generates bi-directional motion vectors for the current block based on the optimal direction (S1104).

The video encoding device generates application direction-indication information based on the optimal direction (S1106). The application direction-indication information indicates the L0-directional motion vector predictors, the L1-directional motion vector predictors, or the bi-directional motion vector predictors.

By Embodiment 2-1, the video encoding device may select an optimal direction based on a cost between the template of the current block and the templates of the reference blocks of the current block, and then may derive the application direction-indication information based on the selected optimal direction. The video encoding device may generate the reference blocks by applying the motion vector difference to the L0-directional motion vector predictor, the L1-directional motion vector predictor, and the bi-directional motion vector predictors.

By Embodiment 2-2, the video encoding device may select an optimal direction based on a cost between the current block and the reference blocks of the current block, and then may determine the application direction-indication information based on the selected optimal direction. The video encoding device may then encode the application direction-indication information.

FIG. 12 is a flowchart of a method performed by the video decoding device for generating the bi-directional motion vectors of the current block, according to another embodiment of the present disclosure.

The video decoding device generates bi-directional motion vector predictors of the current block by using a merge mode (S1200). The bi-directional motion vector predictors include an L0-directional motion vector predictor and an L1-directional motion vector predictor.

The video decoding device generates a uni-directional motion vector difference for the current block by using the MMVD mode (S1202).

The video decoding device obtains application direction-indication information (S1204). The application direction-indication information indicates an L0-directional motion vector predictor, an L1-directional motion vector predictor, or bi-directional motion vector predictors.

By Embodiment 2-1, the video decoding device may select an optimal direction based on a cost between the template of the current block and the templates of the reference blocks of the current block, and then may derive the application direction-indication information based on the selected optimal direction. The video decoding device may generate the reference blocks by applying the motion vector difference to the L0-directional motion vector predictor, the L1-directional motion vector predictor, and the bi-directional motion vector predictors.

By Embodiment 2-2, the video decoding device may decode the application direction-indication information from the bitstream.

The video decoding device applies the motion vector difference to the L0-directional motion vector predictors, the L1-directional motion vector predictors, or the bi-directional motion vector predictors based on the application direction-indication information to generate the bi-directional motion vectors of the current block (S1206).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization. When a component, device, element, apparatus or the like of the present disclosure is described as having a purpose or performing an operation, function, or the like, the component, device, element, apparatus, or the like should be considered herein as being "configured to" meet that purpose or to perform that operation or function.

Various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

124: inter predictor
155: entropy encoder
510: entropy decoder
544: inter predictor

What is claimed is:

1. A method performed by a video decoding device for generating motion vectors of a current block, the method comprising:

generating, by using a merge mode, bi-directional motion vector predictors of the current block, wherein the bi-directional motion vector predictors include an L0-directional motion vector predictor and an L1-directional motion vector predictor;

generating, for the current block, a motion vector difference that is uni-directional by using a merge mode with motion vector difference;

based on a cost between a template of the current block and templates of reference blocks of the current block, determining which of the L0-directional motion vector predictor, the L1-directional motion vector predictor, and the bi-directional motion vector predictors should be compensated with the motion vector difference; and generating, in response to determining which of the L0-directional motion vector predictor, the L1-directional motion vector predictor, and the bi-directional motion vector predictors should be compensated with the motion vector difference, bi-directional motion vectors of the current block by applying the motion vector difference to the L0-directional motion vector predictor, the L1-directional motion vector predictor, or the bi-directional motion vector predictors.

2. The method of claim 1, wherein determining which of the L0-directional motion vector predictor, the L1-directional motion vector predictor, and the bi-directional motion vector predictors should be compensated with the motion vector difference includes:

generating the reference blocks by applying the motion vector difference to each of the L0-directional motion vector predictor, the L1-directional motion vector predictor, and the bi-directional motion vector predictors.

3. The method of claim 1, wherein generating the bi-directional motion vectors includes:

in response to applying the motion vector difference to the bi-directional motion vector predictors, applying the motion vector difference equally to each of the bi-directional motion vector predictors.

4. A method performed by a video encoding device for generating motion vectors of a current block, the method comprising:

generating, by using a merge mode, bi-directional motion vector predictors of the current block, wherein the bi-directional motion vector predictors include an L0-directional motion vector predictor and an L1-directional motion vector predictor;

generating, for the current block, a motion vector difference that is uni-directional by using a merge mode with motion vector difference;

determining, based on a cost between a template of the current block and templates of reference blocks of the current block, which of the L0-directional motion vector predictor, the L1-directional motion vector predictor, and the bi-directional motion vector predictors should be compensated with the motion vector difference; and applying, in response to determining which of the L0-directional motion vector predictor, the L1-directional motion vector predictor, and the bi-directional motion vector predictors should be compensated with the motion vector difference, the motion vector difference to the L0-directional motion vector predictor, the L1-directional motion vector predictor, or the bi-directional motion vector predictors to generate bi-directional motion vectors of the current block.

5. The method of claim 4, wherein determining which of the L0-directional motion vector predictor, the L1-directional motion vector predictor, and the bi-directional motion vector predictors should be compensated with the motion vector difference includes:

generating the reference blocks by applying the motion vector difference to each of the L0-directional motion vector predictor, the L1-directional motion vector predictor, and the bi-directional motion vector predictors.

6. The method of claim 4, wherein generating the bi-directional motion vectors includes:

in response to applying the motion vector difference to the bi-directional motion vector predictors, applying the motion vector difference equally to each of the bi-directional motion vector predictors.

7. A method for transmitting encoded video data comprising a bitstream, the method comprising:

generating the bitstream for a current block in an image; and transmitting the bitstream, wherein generating the bitstream for the image comprises:

generating, by using a merge mode, bi-directional motion vector predictors of a current block, wherein the bi-directional motion vector predictors include an L0-directional motion vector predictor and an L1-directional motion vector predictor;

generating, for the current block, a motion vector difference that is uni-directional by using a merge mode with motion vector difference;

determining, based on a cost between a template of the current block and templates of reference blocks of the current block, which of the L0-directional motion vector predictor, the L1-directional motion vector predictor, and the bi-directional motion vector predictors should be compensated with the motion vector difference; and applying, in response to determining which of the L0-directional motion vector predictor, the L1-directional motion vector predictor, and the bi-directional motion vector predictors should be compensated with the motion vector difference, the motion vector difference to the L0-directional motion vector predictor, the L1-directional motion vector predictor, or the bi-directional motion vector predictors to generate bi-directional motion vectors of the current block.

* * * * *